United States Patent
Ravishankar et al.

(10) Patent No.: US 10,944,470 B2
(45) Date of Patent: Mar. 9, 2021

(54) APPROACHES FOR ADVANCED COMMUNICATIONS CAPABILITIES IN MOBILE SATELLITE COMMUNICATIONS SYSTEMS

(71) Applicant: Hughes Network Systems, LLC, Germantown, MD (US)

(72) Inventors: Channasandra Ravishankar, Clarksburg, MD (US); James Jehong Jong, North Potomac, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 0 days.

(21) Appl. No.: 16/583,080

(22) Filed: Sep. 25, 2019

(65) Prior Publication Data

US 2020/0099443 A1 Mar. 26, 2020

Related U.S. Application Data

(60) Provisional application No. 62/736,075, filed on Sep. 25, 2018.

(51) Int. Cl.
| | |
|---|---|
| *H04W 40/00* | (2009.01) |
| *H04B 7/185* | (2006.01) |
| *H04W 74/02* | (2009.01) |
| *H04W 80/04* | (2009.01) |
| *H04W 72/08* | (2009.01) |
| *H04W 74/00* | (2009.01) |

(52) U.S. Cl.
CPC ...... *H04B 7/18513* (2013.01); *H04W 72/085* (2013.01); *H04W 74/002* (2013.01); *H04W 74/02* (2013.01); *H04W 80/04* (2013.01)

(58) Field of Classification Search
CPC .................................................. H04B 7/18513
See application file for complete search history.

(56) References Cited

U.S. PATENT DOCUMENTS

| | | | |
|---|---|---|---|
| 2008/0220767 A1 | 9/2008 | Aretz et al. | |
| 2014/0297879 A1* | 10/2014 | Gao | .................... H04L 65/1006 709/227 |
| 2015/0358998 A1 | 12/2015 | Golitschek et al. | |
| 2019/0356617 A1* | 11/2019 | Synal | .................... H04L 65/1006 |

FOREIGN PATENT DOCUMENTS

WO WO2018106965 A1 6/2018

* cited by examiner

*Primary Examiner* — Justin Y Lee
(74) *Attorney, Agent, or Firm* — Potomac Technology Law, LLC

(57) ABSTRACT

A method for wireless data communications over a network is provided. Data packets are intended for a first terminal configured for a first communications protocol. Further data packets are intended for a second terminal configured for a second communications protocol and for the first protocol. The data packets are formatted as data bursts in accordance with the first protocol for transmission over a network channel that is configured based on the first protocol. The further data packets are formatted as data bursts in accordance with the second protocol for transmission over the network channel, and for transmission at a higher throughput rate of the second protocol (not compatible with the first protocol). The data bursts of the first protocol are transmitted over the channel for receipt by the first terminal. The data bursts of the second protocol are transmitted over the channel for receipt by the second terminal.

14 Claims, 11 Drawing Sheets

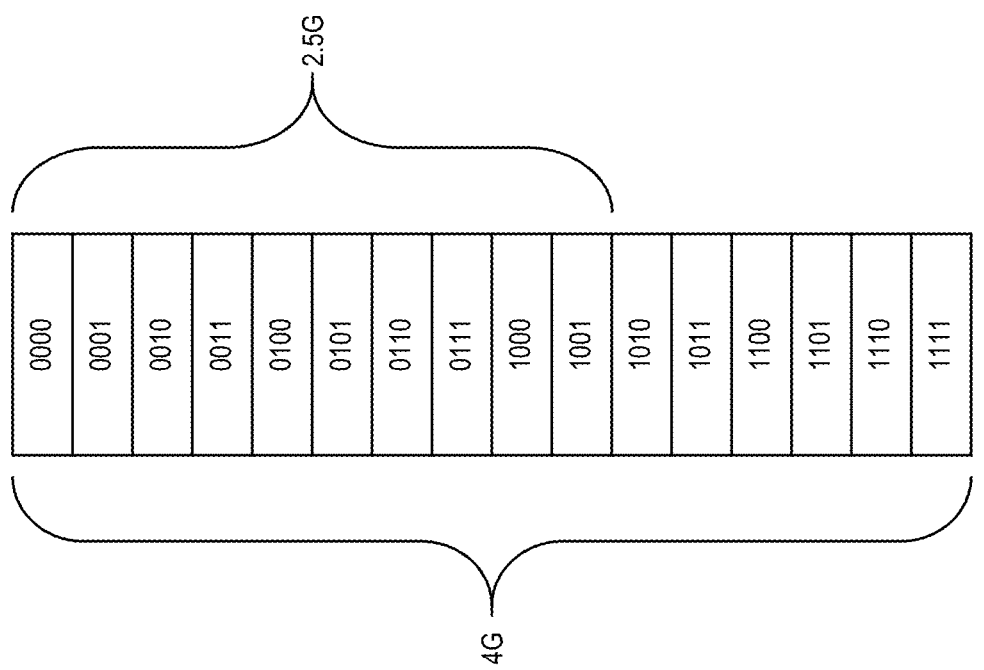

APPROACHES FOR ADVANCED COMMUNICATIONS CAPABILITIES IN MOBILE SATELLITE COMMUNICATIONS SYSTEMS

RELATED APPLICATIONS

This application claims the benefit of the earlier filing date under 35 U.S.C. § 119(e) from U.S. Provisional Application Ser. No. 62/736,075 (filed 2018 Sep. 25).

BACKGROUND

Demands for improved mobile voice and data communications services continue to increase at an exponential rate. Accordingly, terrestrial communications systems (e.g., Third Generation (3G) and Fourth Generation (4G) terrestrial (e.g., cellular) mobile communications systems continue to advance to meet such increasing demands, and provide higher and higher speed and throughput for voice and multimedia services to end-users (e.g., voice, data, video, images, etc.). Such services can also accommodate differentiated quality of service (QoS) across various applications. To facilitate this, terrestrial architectures have moved to end-to-end Internet Protocol (IP) architectures that unify all services, including voice, over the IP bearer. In parallel with such terrestrial architectures and systems, mobile satellite systems are being designed to complement and/or co-exist with terrestrial coverage depending on spectrum sharing rules and operator choice. Among such mobile satellite systems, 3G UMTS-based networks using terrestrial 3G protocols have been widely deployed all over the world.

Terrestrial and satellite telecommunications services, rely on protocols and networking architectures that offer great flexibility and robustness. Mobile satellite systems advantageously use terrestrial 3G protocols in non-access stratum to allow interaction with terrestrial core networks and exploit widespread availability of terrestrial protocol stacks in user terminals. With regard to security, the terrestrial 3G protocols used by mobile satellite systems include security aspects such as SIM-based authentication, authorization and key agreement protocols. Radio access stratum in mobile satellite systems are typically optimized for the satellite environment, and therefore tend to be different than their terrestrial counterparts. Satellite base stations in user terminal chipsets that incorporate access stratum protocols and functions specific to satellite operation are readily developed and deployed. Moreover, applications/services/users requiring a high level of security (which at one time were addressed through proprietary segregated and highly secure systems and architectures (e.g., military and law enforcement systems), increasingly rely on broader-based commercial systems. Mobile satellite communications systems, based on their ability to reach diverse geographic regions without investment in significant ground-based infrastructure, are widely used for such high-security systems. This allows such high security services to be able to interoperate with broad-based commercial systems, and leverage the technology advancements and extensive infrastructure of such systems. Along with the proliferation of such high-security services, and the associated advancements in supporting technologies, security risks remain an ever-increasing threat.

Accordingly, there exists an increasing need for improved throughput, improved quality of service (QoS), and improved security protocols and location privacy in the data and voice services provided by mobile satellite communications systems.

Some Example Embodiments

The present invention advantageously addresses the foregoing requirements and needs, as well as others, by providing system architectures and protocols for the provision of improved throughput, improved quality of service (QoS), and improved security protocols and location privacy in the data and voice services provided by such mobile communications systems. According to example embodiments, such system architectures and protocols provide an enhanced Geo Mobile Packet Radio Service (GMPRS or 2.5 generation communications services) that integrates fourth generation (4G-based) services with existing GMPRS (2.5G-based) services.

In accordance with example embodiments, a method is provided for wireless data communications. A plurality of data packets intended for transmission to a first communications terminal are received, and a plurality of further data packets intended for transmission to a second communications terminal are received. The plurality of data packets are formatted as at least one data burst in accordance with a first transmission protocol for transmission over a first frequency channel of a wireless communications network, wherein the first frequency channel is configured based on the first transmission protocol. The plurality of further data packets are formatted as at least one data burst in accordance with a second transmission protocol for transmission over the first frequency channel, wherein the one or more further data packets are formatted for transmission at a throughput rate of the second transmission protocol that is not compatible with the first transmission protocol. One or more of the at least one data burst formatted in accordance with the first transmission protocol is/are transmitted over the first frequency channel for receipt by the first communications terminal. One or more of the at least one data burst formatted in accordance with the second transmission protocol is/are transmitted over the first frequency channel for receipt by the second communications terminal.

According to a further embodiment of the method, the first communications terminal is configured to receive data communications transmitted in accordance with the first transmission protocol and is not configured to receive data communications transmitted in accordance with the second transmission protocol, and the second communications terminal is configured to receive data communications transmitted in accordance with both the first transmission protocol and the second transmission protocol.

According to a further embodiment of the method, an information data packet for a respective one of each of the one or more data bursts is configured such that each information data packet indicates the transmission protocol in accordance with which the respective one of the one or more data bursts was formatted. Each of the information data packets is formatted in accordance with the first transmission protocol for transmission over the first frequency channel. Each of the information data packets as formatted in accordance with the first transmission protocol is transmitted, together with the respective one of the one or more data bursts, over the first frequency channel for receipt by both the first communications terminal and the second communications terminal. According to a further such embodiment, each of one or more of the information data packets includes information indicating an allocation of one or more timeslots of a second frequency channel assigned to a respective one of the first and second communications terminals for transmission of data communications over the second frequency channel by the respective one of the first and second communications terminals. According to yet a further such embodiment, the first communications terminal is configured to receive data communications transmitted in accordance with the first transmission protocol and is not configured to receive data communications transmitted in accordance with the second transmission protocol, and the second communications terminal is configured to receive data communications transmitted in accordance with both the first transmission protocol and the second transmission protocol.

According to a further embodiment of the method, the at least one data burst formatted in accordance with the second transmission protocol comprises a plurality of data bursts formatted in accordance with the second transmission protocol, and formatted for transmission at the throughput rate of the second transmission protocol that is not compatible with the first transmission protocol, and (i) a first subset of the plurality of data bursts is transmitted over the first frequency channel for receipt by the second communications terminal, and (ii) a second subset of the plurality of data bursts is transmitted over a second frequency channel of the wireless communications network for receipt by the second communications terminal, wherein the second frequency channel is also configured based on the first transmission protocol. According to a further such embodiment, the data packets that were formatted as the plurality of data bursts are all related to a one application or service associated with the second communications terminal.

In accordance with further example embodiments, a gateway (GW) terminal is provided for wireless data communications. The GW terminal comprises a processor device and a transmitter device. The processor device is configured to receive a plurality of data packets intended for transmission to a first communications terminal, and to receive a plurality of further data packets intended for transmission to a second communications terminal. The processor device is further configured to format the plurality of data packets as at least one data burst in accordance with a first transmission protocol for transmission over a first frequency channel of a wireless communications network, wherein the first frequency channel is configured based on the first transmission protocol. The processor device is further configured to format the plurality of further data packets as at least one data burst in accordance with a second transmission protocol for transmission over the first frequency channel, wherein the one or more further data packets are formatted for transmission at a throughput rate of the second transmission protocol that is not compatible with the first transmission protocol. The transmitter device is configured to transmit one or more of the at least one data burst formatted in accordance with the first transmission protocol over the first frequency channel for receipt by the first communications terminal, and to transmit one or more of the at least one data burst formatted in accordance with the second transmission protocol over the first frequency channel for receipt by the second communications terminal.

According to a further embodiment of the GW terminal, the first communications terminal is configured to receive data communications transmitted in accordance with the first transmission protocol and is not configured to receive data communications transmitted in accordance with the second transmission protocol, and the second communications terminal is configured to receive data communications transmitted in accordance with both the first transmission protocol and the second transmission protocol.

According to a further embodiment of the GW terminal, the processor device is further configured to configure an information data packet for a respective one of each of the one or more data bursts such that each information data packet indicates the transmission protocol in accordance with which the respective one of the one or more data bursts was formatted, and to format each of the information data packets in accordance with the first transmission protocol for transmission over the first frequency channel. Each of the plurality of information packets as formatted in accordance with the first transmission protocol are configured to be transmitted, together with the respective one of the one or more data bursts, over the first frequency channel for receipt by both the first communications terminal and the second communications terminal. According to a further such embodiment, each of one or more of the information data packets includes information indicating an allocation of one or more timeslots of a second frequency channel assigned to a respective one of the first and second communications terminals for transmission of data communications over the second frequency channel by the respective one of the first and second communications terminals. According to yet a further such embodiment, the first communications terminal is configured to receive data communications transmitted in accordance with the first transmission protocol and is not configured to receive data communications transmitted in accordance with the second transmission protocol, and the second communications terminal is configured to receive data communications transmitted in accordance with both the first transmission protocol and the second transmission protocol.

According to a further embodiment of the GW terminal, the at least one data burst formatted in accordance with the second transmission protocol comprises a plurality of data bursts formatted in accordance with the second transmission protocol, and formatted for transmission at the throughput rate of the second transmission protocol that is not compatible with the first transmission protocol, and (i) a first subset of the plurality of data bursts are configured for transmission over the first frequency channel for receipt by the second communications terminal, and (ii) a second subset of the plurality of data bursts are configured for transmission over a second frequency channel of the wireless communications network for receipt by the second communications terminal, wherein the second frequency channel is also configured based on the first transmission protocol. According to a further such embodiment, the data packets that were formatted as the plurality of data bursts are all related to a one application or service associated with the second communications terminal.

In accordance with further example embodiments, a system for wireless data communications is provided. The system comprises a gateway (GW) terminal, a first communications terminal and a second communications terminal. The GW terminal comprises a processor device and a transmitter device. The processor device of the gateway terminal is configured to receive a plurality of data packets intended for transmission to a first communications terminal, and to receive a plurality of further data packets intended for transmission to a second communications terminal. The processor device of the gateway terminal is further configured to format the plurality of data packets as at least one data burst in accordance with a first transmission protocol for transmission over a first frequency channel of a wireless communications network, wherein the first frequency channel is configured based on the first transmission protocol. The processor device of the gateway terminal is further configured to format the plurality of further data packets as at least one data burst in accordance with a second transmission protocol for transmission over the first frequency channel, wherein the one or more further data packets are formatted for transmission at a throughput rate of the second transmission protocol that is not compatible with the first transmission protocol. The transmitter device of the gateway terminal is configured to transmit one or more of the at least one data burst formatted in accordance with the first transmission protocol over the first frequency channel for receipt by the first communications terminal. The transmitter device of the gateway terminal is further configured to transmit one or more of the at least one data burst formatted in accordance with the second transmission protocol over the first frequency channel for receipt by the second communications terminal. The first communications terminal is configured to receive data communications transmitted in accordance with the first transmission protocol and is not configured to receive data communications transmitted in accordance with the second transmission protocol, and the second communications terminal is configured to receive data communications transmitted in accordance with both the first transmission protocol and the second transmission protocol.

According to a further embodiment of the system, the processor device of the gateway terminal is further configured to configure an information data packet for a respective one of each of the one or more data bursts such that each information data packet indicates the transmission protocol in accordance with which the respective one of the one or more data bursts was formatted, and to format each of the information data packets in accordance with the first transmission protocol for transmission over the first frequency channel. Each of the plurality of information packets as formatted in accordance with the first transmission protocol are configured to be transmitted, together with the respective one of the one or more data bursts, over the first frequency channel for receipt by both the first communications terminal and the second communications terminal.

According to a further embodiment of the system, the at least one data burst formatted in accordance with the second transmission protocol comprises a plurality of data bursts formatted in accordance with the second transmission protocol, and formatted for transmission at the throughput rate of the second transmission protocol that is not compatible with the first transmission protocol, and (i) a first subset of the plurality of data bursts are configured for transmission over the first frequency channel for receipt by the second communications terminal, and (ii) a second subset of the plurality of data bursts are configured for transmission over a second frequency channel of the wireless communications network for receipt by the second communications terminal, wherein the second frequency channel is also configured based on the first transmission protocol.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The present invention is illustrated by way of example, and not by way of limitation, in the figures of the accompanying drawings, and in which like reference numerals refer to similar elements and in which:

FIG. 3 depicts a table of possible PUI information bit combinations each signifying a different modulation and coding scheme, in accordance with example embodiments;

DETAILED DESCRIPTION

Figure 1A:
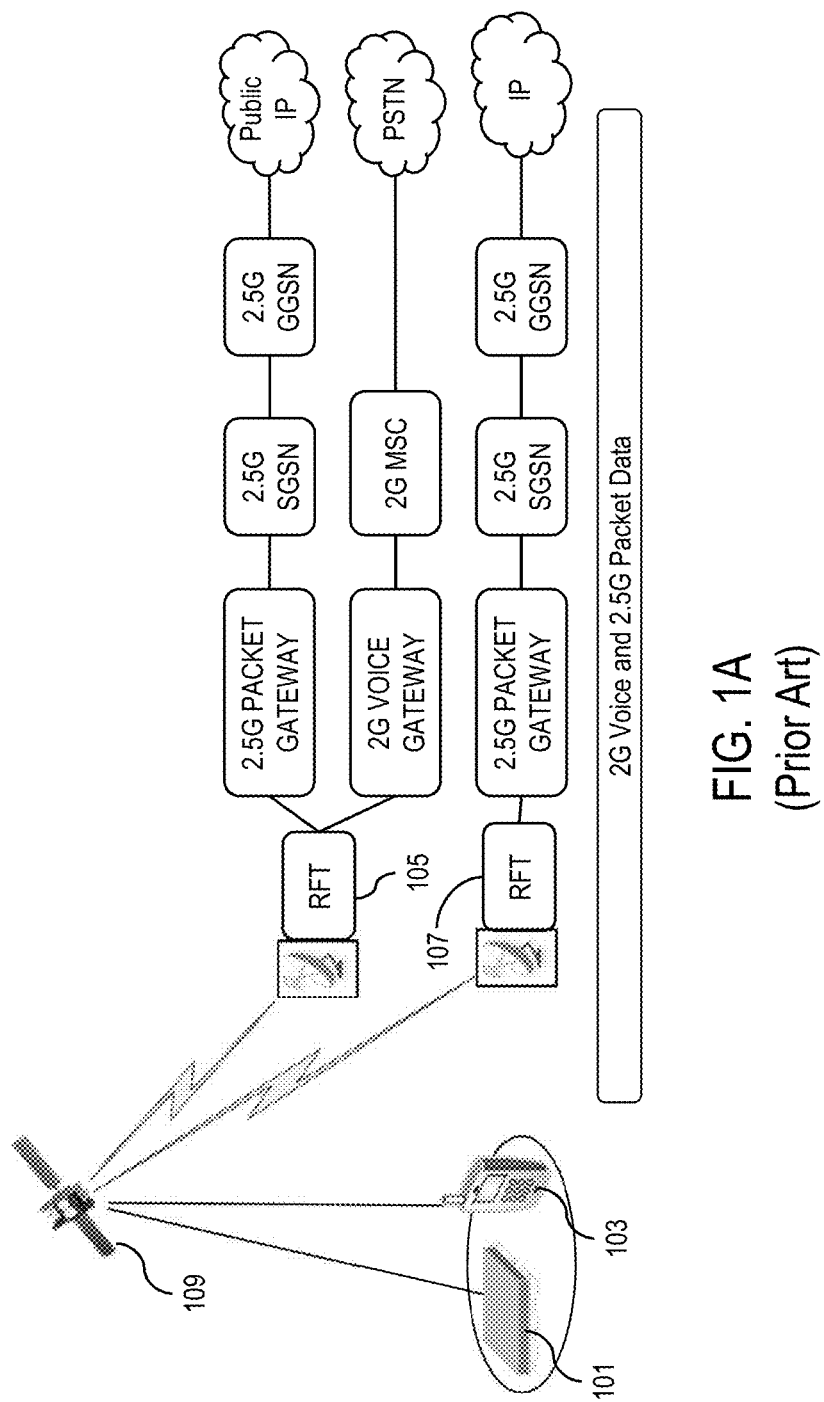
FIG. 1A depicts a diagram of a prior art GMPRS (2.5G) mobile satellite communications system.

The following example embodiments of the present invention provide system architectures and protocols for the provision of improved throughput, improved quality of service (QoS), and improved security protocols and location privacy in the data and voice services provided by such mobile communications systems. In the following description, for the purposes of explanation, numerous specific details are set forth in order to provide a thorough understanding of the invention. It is apparent, however, that the invention may be practiced without these specific details or with an equivalent arrangement. In other instances, well-known structures and devices are shown in block diagram form in order to avoid unnecessarily obscuring the invention.

Further, a module or component (as referred to herein) may be composed of software component(s), which are stored in a memory or other computer-readable storage medium, and executed by one or more processors or CPUs of the respective devices. As will also be appreciated, however, a module may alternatively be composed of hardware component(s) or firmware component(s), or a combination of hardware, firmware and/or software components. Further, with respect to the various example embodiments described herein, while certain of the functions are described as being performed by certain components or modules (or combinations thereof), such descriptions are provided as examples and are thus not intended to be limiting. Accordingly, any such functions may be envisioned as being performed by other components or modules (or combinations thereof), without departing from the spirit and general scope of the present invention. Moreover, the components, methods, processes and approaches described herein may be processor-implemented using processing circuitry that may comprise one or more microprocessors, digital signal processors, application specific integrated circuits (ASICs), field programmable gate arrays (FPGAs), or other devices operable to be configured or programmed to implement the systems and/or methods described herein. For implementation on such devices that are operable to execute software instructions, the flow diagrams and methods described herein may be implemented in processor instructions stored in a computer-readable medium, such as executable software stored in a computer memory store.

Further, terminology referring to computer-readable media or computer media or the like as used herein refers to any medium that participates in providing instructions to the processor of a computer or processor module or component for execution. Such a medium may take many forms, including but not limited to non-transitory non-volatile media and volatile media. Non-volatile media include, for example, optical disk media, magnetic disk media or electrical disk media (e.g., solid state disk or SDD). Volatile media include dynamic memory, such random access memory or RAM. Common forms of computer-readable media include, for example, floppy or flexible disk, hard disk, magnetic tape, any other magnetic medium, CD ROM, CDRW, DVD, any other optical medium, random access memory (RAM), programmable read only memory (PROM), erasable PROM, flash EPROM, any other memory chip or cartridge, or any other medium from which a computer can read data.

Moreover, while the following example embodiments of the present invention are described in the context of geosynchronous mobile satellite communications systems, as would be appreciated, the aspects and concepts regarding the enhancement of throughput and bandwidth for advanced mobile terminals may similarly be applicable to other mobile communications systems (such as mobile communications systems employing low earth orbit (LEO) satellites, medium earth orbit (MEO) satellites, high altitude platform (HAP) based systems, etc.). Additionally, while the following example embodiments of the present invention are generally described with regard to the 2.5G and 4G standards-based protocols, as would be appreciated, the aspects and concepts regarding the enhancement of throughput and bandwidth for advanced mobile terminals may similarly be applicable to other protocols (such as 2G protocols, 3G protocols, 5G protocols, etc.)

FIG. 1A depicts a diagram of a prior art GMPRS (2.5G) mobile satellite communications system. As shown in this Figure, multiple user terminals (e.g., data terminal 101 and voice/data terminal 103) communicate with multiple gateway terminals (e.g., RFT 105 and RFT 107) via one or more satellites (of which only one is shown—satellite 109). From the RFT 105, data and voice packets are segregated, and the data packets are transferred to a 2.5G packet gateway (PGW) and the voice packets are transferred to a 2G voice gateway (VGW). From there the data/voice packets from the RFT 105 are processed by the 2.5G PGW and the 2G VGW and subsequently transferred to a 2.5G serving general packet radio service (GPRS) support node (SGSN) and a 2G mobile switching center server (MSC server or MSS), respectively. Similarly the data packets from the RFT 107 are processed by a 2.5G PGW and subsequently transferred to a 2.5G SGSN. The packets from each of the 2.5G SGSN's are then routed to a respective 2.5G gateway general packet radio service (GPRS) support node (GGSN), from where they can then be routed to a respective IP network (e.g., a private IP network or a public IP network (such as the Internet)), and the voice packets may then be transferred by the 2G MSC to the public switched telephone network (PTSN). In this prior art system, the processing and protocols of the network are implemented in accordance with the existing 2.5G GMPRS (e.g., the European Telecommunications Standards Institute (ETSI) TS 101-376 standard) and 2G standards (e.g., the standards documents listed in the 3GPP TS 41.101).

Figure 1B:
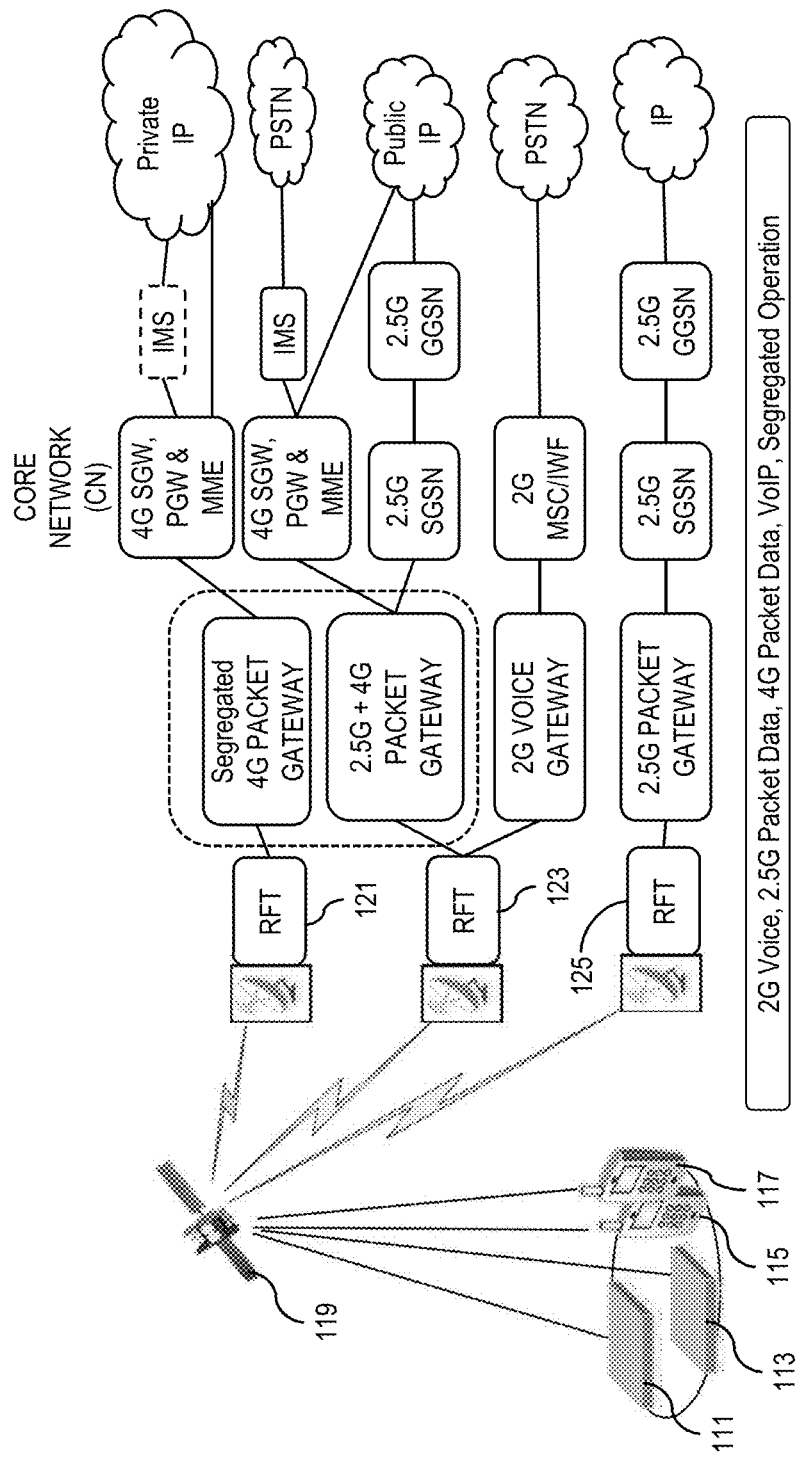
FIG. 1B depicts a diagram of an enhanced 2.5G+4G mobile satellite communications system, in accordance with example embodiments.

FIG. 1B depicts a diagram of an enhanced 2.5G+4G (or GMPRS+4G) mobile satellite communications system, in accordance with example embodiments of the present invention. As shown in this Figure, multiple user terminals (e.g., the user terminals 111, 113, 115, 117) communicate with multiple gateway terminals (e.g., the RFT's 121, 123, 125) via one or more satellites (of which only one is shown—satellite 119). Similar to FIG. 1A, the packets from the RFT 125 follow a processing/routing sequence first to a 2.5G PGW, then a 2.5G SGSN, then a 2.5G GGSN, and then to an internet IP network. In this system, however, packets from the RFT 123, for example, may include 2G voice packets and 2.5G+4G data and multimedia (including voice) packets. The 2G voice packets may be processed/routed as are the 2G voice packets in FIG. 1A. The 2.5G+4G packets, however, are transferred to a 2.5G+4G packet gateway (which may alternatively be referred to herein as an enhanced PGW or EPGW). In this context, such embodiments of the present invention provide a 2.5G+4G PGW that supports one or more integrated 2G+4G channels. Accordingly, such a 2.5G+4G channel supports both 2.5G and 4G packet data services. The EPGW processes the packets and segregates them into standard 2.5G data packets and standard 4G data packets. The 2.5G data packets may then be processed by a 2.5G SGSN and routed to a 2.5G GGSN, and from there may be routed to a public IP network (e.g., the Internet) or to a private IP network (not shown in the Figure). Alternatively, the 4G data packets may then be processed by a standard 4G core network (e.g., a standard 4G SGW, PGW and MME (mobility management entity)), and from there may be further processed by an IP multimedia subsystem (IMS) and routed to the PSTN (e.g., voice over IP) or routed directly to a public IP network (e.g., the Internet) or to a private IP network (not shown in the Figure). Also, for example, 4G packets received by the RFT 121 may be routed to a separate standard 4G PGW, and from there processed and routed to a private IP network or to a public IP network (not shown in the Figure), either directly or through an IMS. As would be recognized by one of ordinary skill in the art, various other combinations of data integration and processing/routing may be possible in such a network.

In such mobile systems, such as 2.5G, 3G and 4G, in a given cell, the same frequency cannot be used to provide services of two different bandwidths or throughput. For example, when the terrestrial mobile systems evolved from a 2.5G network to a 3G network the communications channels moved from TDMA using a 200 kHz channel to wideband CDMA using a 5 MHz channel. As such, a carrier could not provide 2.5G and 3G services using the same frequency—hence, such multiple services required more spectrum. In other words, as such telecommunications systems evolve, more spectrum is required to support legacy services and new evolved services. To address such issues, embodiments of the present invention provide system architectures and protocols that support the integration of different standards-based services (e.g., 2.5G+4G services) via a single carrier.

Figure 2A:
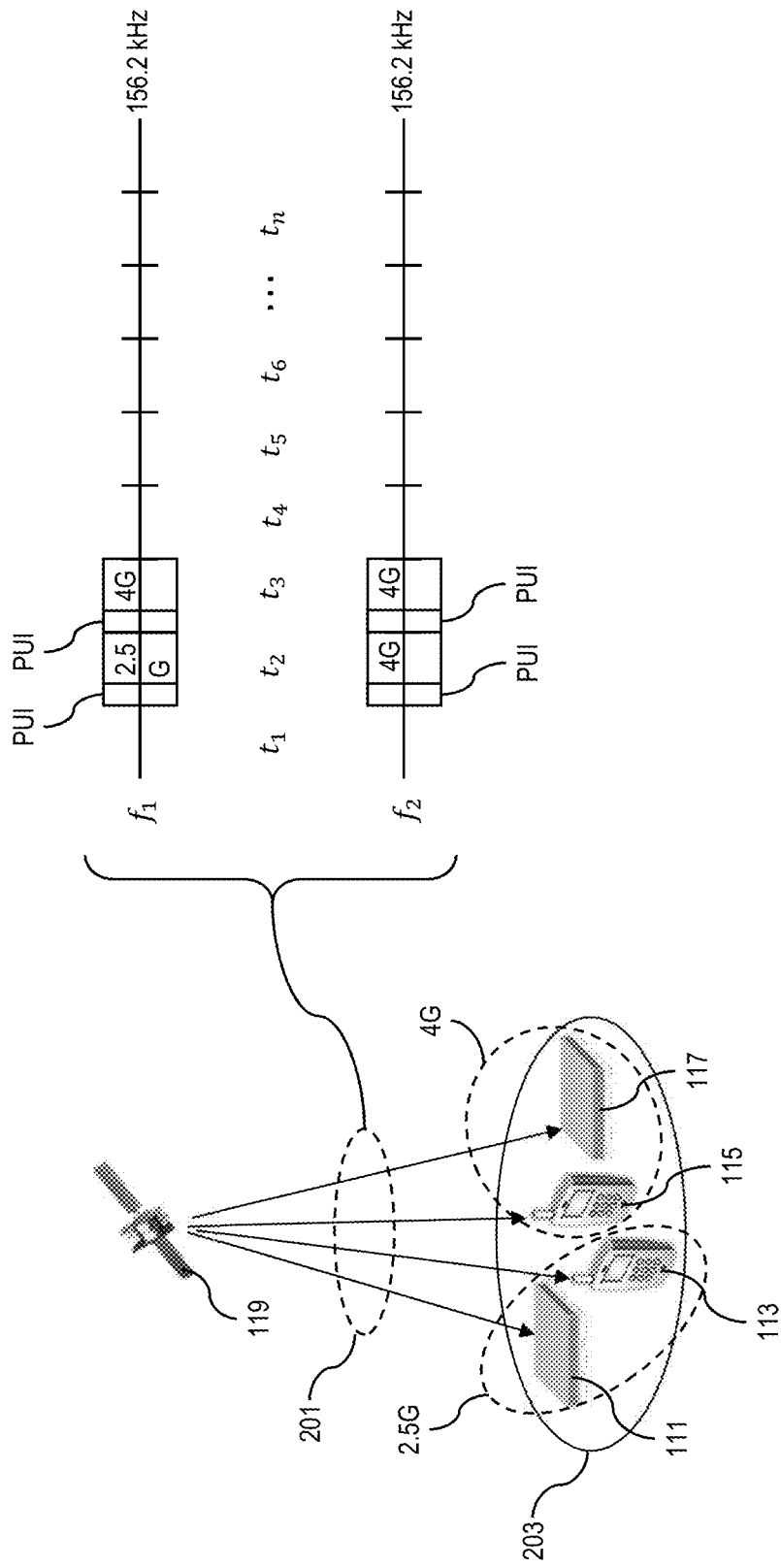
FIG. 2A depicts an example of two carriers or frequency channels of the forward link of the system of FIG. 1B, with multiple lower order user terminals and multiple higher order user terminals operating in the same cell, in accordance with example embodiments.

FIG. 2A depicts an example of two carriers or frequency channels of the forward link of the system of FIG. 1B, with multiple lower order user terminals (e.g., the user terminals 111, 113, such as 2.5G terminals) and multiple higher order user terminals (e.g., the user terminals 115, 117, such as 4G terminals) operating in the same cell 203, in accordance with example embodiments.

According to such example embodiments, system features may be as follows:

- All-IP 3GPP 4G LTE protocol architecture with satellite specific optimizations in Access Stratum.
- Access Stratum waveforms and protocols may leverage standardized GMR-1, GMPRS and GMR-1 3G waveforms and protocols, which permits backwards compatibility.
- Access Stratum waveforms and protocols may leverage standardized GMR-1, GMPRS and GMR-1 3G waveforms and protocols, whereby (i) the Core Network can be a standard 4G LTE EPC Core, (ii) commercial off-the-shelf (COTS) protocol stack products can be employed in user terminals for the NAS layer.
- Protocols and interfaces between 4G Satellite Base Station Subsystem (4G-SBSS) and Core Network based on 4G LTE S1-U and S1-MME interfaces.
- Spectrally efficient VoIP.
- Improved voice quality performance.
- Multiple vocoder rates (2.45 kbps and 4 kbps) for robustness.
- AES-256 encryption at Link Layer.
- Transparent operation for application layer encryption.
- GPS Hiding/Encryption.
- 2 Mbps operation using carrier aggregation.
- Higher order modulation for 512 kbps on 5× channel.
- Seamless beam-to-beam handover.
- Frequency Handover.
- Differentiated QoS for guaranteed bit rate (GBR) and non-GBR services
- Dynamic link adaptation.
- Multiple terminal type handling.
- Resource efficient multicast.
- Resource and delay efficient push-to-talk (PTT).
- Backward compatibility with legacy terminals.
- Use of only single CCCH carrier to accommodate 2G, 2.5G and 4G operation.
- Segregated CCCH operation.
- High penetration alerting.
- IMS based supplementary services.
- Header compression for both voice and data.
- V.44 Compression for IP data.
- SIGCOMP compression for IMS signaling.

By way of example, the satellite beam 201 may service the forward link data communications to the user terminals via the two carriers $f_1$ and $f_2$ (e.g., each being a 156.2 kHz carrier in accordance with the 2.5G protocols) operating at two different respective frequencies. Each of the carriers carries data being transmitted to the respective user terminals via the timeslots $t_1, t_2, \ldots, t_n$. As shown in the figure, the timeslot $t_2$ of the carrier $f_1$ may be carrying a 2.5G data burst destined to one or more of the 2.5G user terminals. Further, on the same carrier $f_1$, the timeslot $t_3$ may be carrying a 4G data burst. This may be accomplished by using a modulation and coding scheme for the 4G data burst that achieves higher throughput rate for the respective timeslot of the respective carrier. Whereas, the 2.5G data burst will use a lower order modulation and coding scheme to achieve the 2.5G throughput in the respective timeslot of the respective carrier. Accordingly, the higher throughput 4G data bursts will only be decodable by the 4G term user terminals, while the 2.5G and the 4G data bursts will be decodable by both the 2.5G and 4G user terminals. Further, the same symbol rate is maintained for both the 2.5G and 4G data bursts—where, for the higher order modulation/coding schemes the number of bits per symbol is increased achieving a higher throughput and higher spectral efficiency. As used herein, the terminology "forward link" refers to data transmissions from the satellite gateway (SBSS) to the user terminals (downlink transmissions from the satellite to the terminals), and the terminology return link refers to data transmissions from the user terminals to the satellite gateway (uplink transmissions from the terminals to the satellite).

By way of further example, allocations of uplink timeslots assigned to a user terminal for that terminals uplink transmissions on the return link are provided via PUI (public information bits) data bursts included with forward link data bursts in forward link or downlink timeslots. Each PUI provides data indicating the particular user terminal to which the next frame or timeslot is allocated on a respective uplink channel. Further, each PUI is encoded and modulated based on the 2.5G transmission protocol. In that regard, each 2.5G and 4G user terminal monitors every timeslot and decodes the respective PUI information. For example, while each of the timeslots $t_2$, $t_3$ of the carrier $f_2$ may be carrying 4G data bursts, the 2.5G terminals will still be able to maintain synchronization and decode the PUI information of the timeslots $t_2$, $t_3$. Further, each PUI also carries information indicating the modulation and coding to be used to decode the remainder of the data burst. In other words, each PUI of the timeslots $t_2$, $t_3$ of the carrier $f_2$ will identify the modulation and coding necessary for demodulating and decoding by the terminal to which the data of the respective timeslot is directed. This way, both the 2.5G and the 4G user terminals will be able to decode the PUI information, and in the event that the data of the remainder of the timeslot is 4G data, only a 4G user terminal will be able to decode that data. Each forward link carrier is thereby compatible with the 4G terminals and also backwards compatible with the 2.5G terminals.

FIG. 3 depicts a table of possible PUI information bit combinations each signifying a different modulation and coding scheme (e.g., a particular modulation and code rate used to encode and modulate the respective data burst). Accordingly, with four bits, there are 16 possible modulation/coding schemes. For example, if there are 10 modulation/coding schemes for the lower throughput terminals (e.g., 2.5G terminals), then there will be an additional six bit combinations for six additional higher protocol/throughput terminals (e.g., 4G terminals). Further, as would be appreciated, the higher order terminals will also be able to decode the lower order modulation/coding schemes (e.g., if the channel conditions only permit transmissions at the lower order modulation/coding schemes).

According to example embodiments, therefore, data bursts of different transmission protocols (e.g., 2.5G and 4G protocols of differing data throughputs) may be multiplexed in time on a single carrier of a given frequency, with data bits included in each frame (which provide information indicating the particular protocol of the data burst) utilizing the lowest common denominator protocol compatible with all user terminals of the system.

Figure 4A:
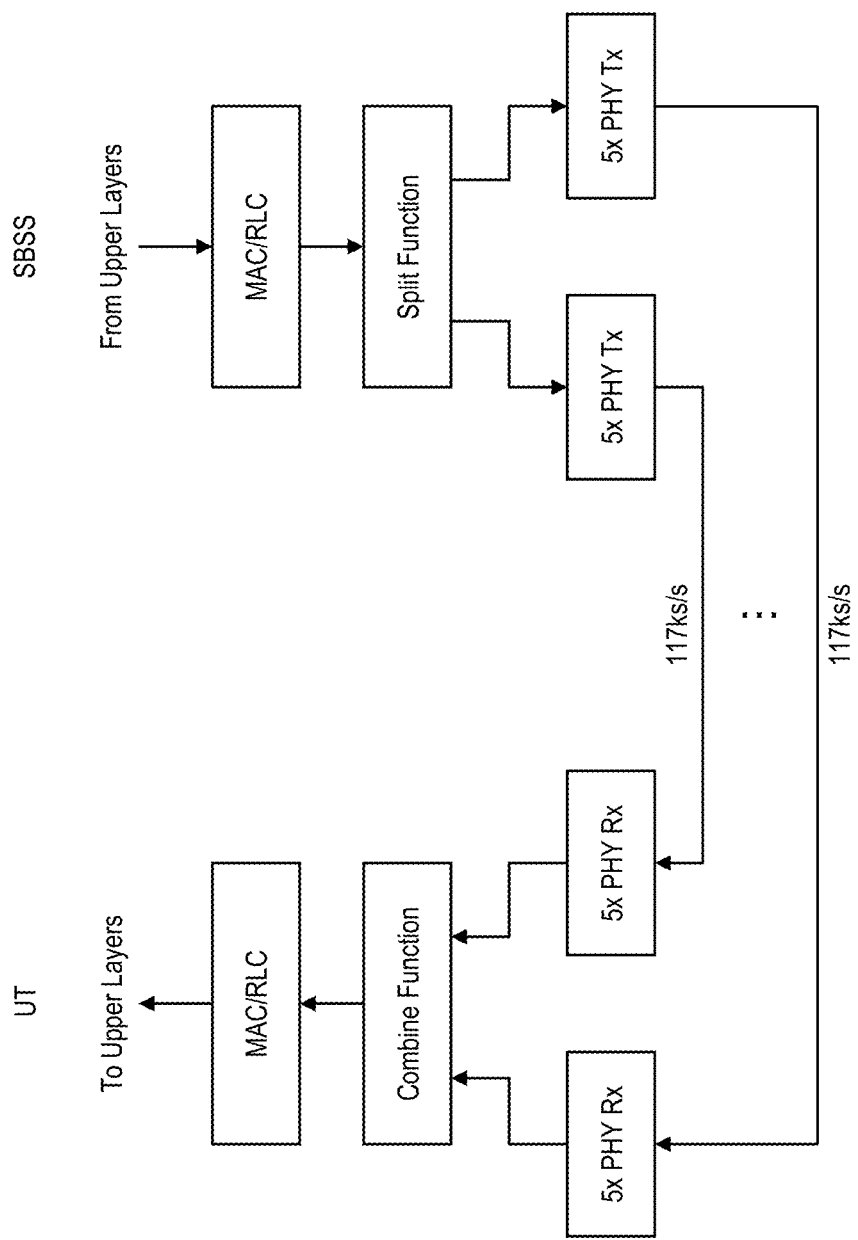
FIG. 4A depicts an example of carrier aggregation in the forward link (from the SBSS to a UT) with respect to the satellite base station subsystem (SBSS)/satellite gateway (SGW) and the user terminal (UT), in accordance with example embodiments.

FIG. 4A depicts an example of carrier aggregation in the forward link (from the SBSS to a UT) with respect to the satellite base station subsystem (SBSS)/satellite gateway (SGW) and the user terminal (UT), in accordance with further example embodiments. According to such further example embodiments, even higher throughputs may be achieved by utilizing carrier aggregation. By way of example, a 4G terminal is capable of decoding multiple different carrier frequencies at the same time. Further, each individual carrier remains backwards compatible with lower order terminals in the system (e.g., 2.5G terminals). As shown in the Figure, a satellite bases station (SBSS) may aggregate data transmissions to a particular higher order user terminal (UT) over multiple individual carriers on the forward link, where such data transmissions may be related to a single application running on or associated with the UT to which the data is being transmitted. In other words, multiple carriers (e.g., multiple 156.25 KHz carriers of the 2.5G protocol, where each 156.25 KHz carrier, for example, is a 5× 2.5G frequency channel (5×31.25=156.25 KHz)) are scheduled for a single UT (e.g., a 4G UT). In this SBSS, a single media access control/radio link control (MAC/RLC) layer is common to multiple carriers in the same satellite beam. As such, the SBSS may perform a beam-level scheduling rather than of a carrier-level scheduling. Further, as would be appreciated, this carrier aggregation concept can be applied to as many carriers as the target terminal is capable of decoding simultaneously. For example, aggregating six 5× carriers yields up to 2.664 Mbps. Further, 2.5G carriers may be aggregated with 4G carriers for transmissions to s 4G terminal.

Referring again to FIG. 4A, data destined for the UT is transferred from the upper layers of the SBSS to the MAC/RLC layer of the SBSS. Once processed by the MAC/RLC layer, the data is transferred to a split function which splits the data amongst the multiple carriers that are going to be aggregated for the UT, and encodes and modulates the individual data bursts for each of the carriers. The data bursts are then transmitted to the UT via the respective carriers, over the satellite. The UT receives each of the carriers, decodes them and forwards the individual data bursts to a combine function. The combine function reassembles the data bursts into the original data as output by the MAC/RLC layer of the SBSS, and forwards the reassemble data to the MAC/RLC layer of the UT. The MAC/RLC layer of the UT processes the data accordingly and forwards it to the upper layers of the UT. Further, the SBSS may integrate the multiple protocols of the terminals of the system via a multi-stack architecture. For example, in a system supporting both 2.5G and 4G terminals, the SBSS may be implemented with an integrated stack architecture, with the 2.5G protocol stack and the 4G protocol stack being integrated together. As such, each of the 5× physical transmit channels (5×PHY Tx) of FIG. 4A being capable of handling 2.5G and 4G transmissions (5× being a 5×31.25=156.25 KHz channel), in addition to an aggregation of multiple individual carriers. In that regard, the SBSS supports single channel transmissions to higher order terminals (e.g., 4G terminals), while being completely backwards compatible for single channel transmissions to lower order terminals (e.g., 2.5G terminals).

Figure 4B:
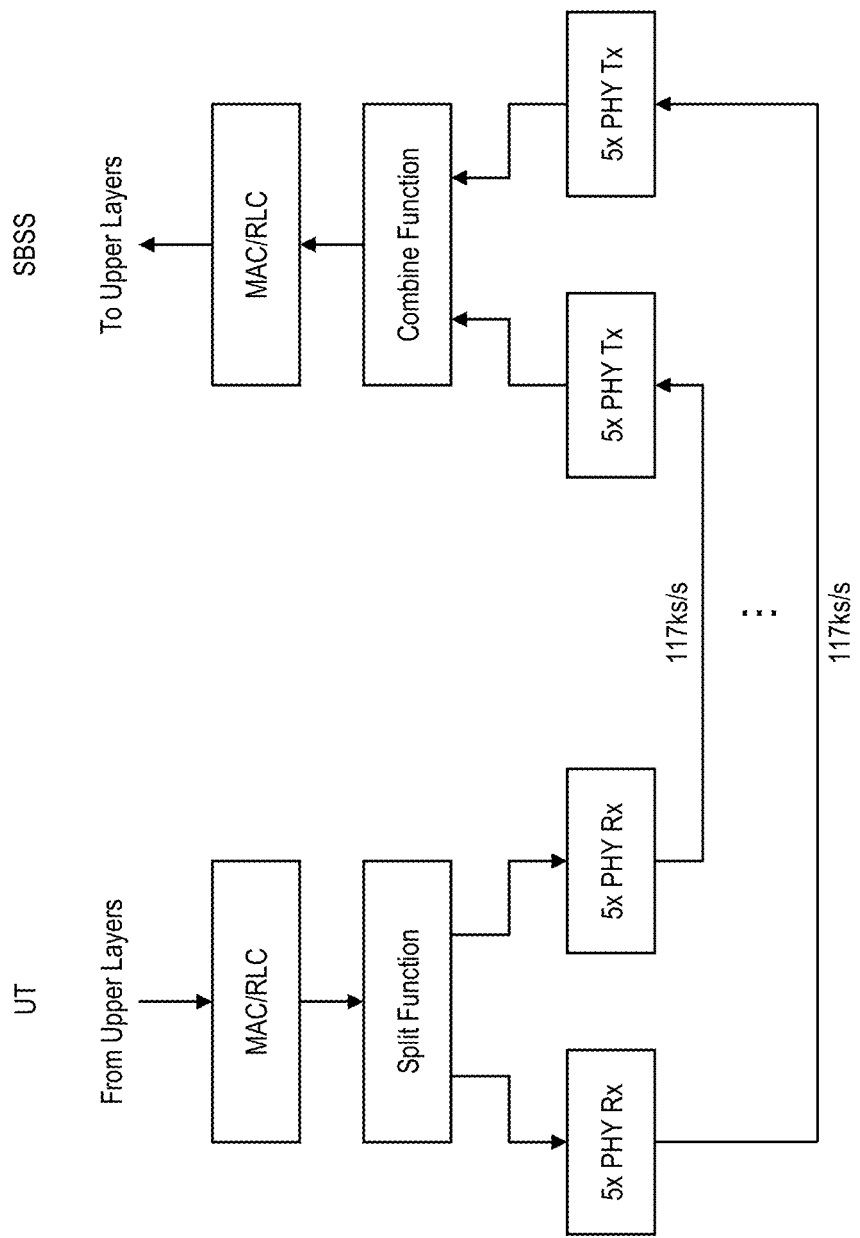
FIG. 4B depicts an example of carrier aggregation in the return link (from a UT to the SBSS) with respect to the user terminal (UT) and the satellite base station subsystem (SBSS)/satellite gateway (SGW), in accordance with example embodiments.

FIG. 4B depicts an example of carrier aggregation in the return link (from a UT to the SBSS) with respect to the user terminal (UT) and the satellite base station subsystem (SBSS)/satellite gateway (SGW), in accordance with further example embodiments. In accordance with such further example embodiments, a similar carrier aggregation scheme may be employed for the return link. In the return link, a higher order terminal can perform carrier aggregation (e.g., in the same manner as depicted in FIG. 4A, but in the opposite direction). Since the gateway or SBSS assigns the uplink (return link) transmission slots to a terminal, it may assign parallel slots on different carriers for purposes of carrier aggregation. In this manner, the UT will split the packets amongst the assigned timeslots on the respective carriers, and the SBSS will combine the packets from the multiple carriers to regenerate the original data. Further, since the SBSS knows which timeslots are assigned to a particular terminal, the gateway may instruct the terminal to transmit at a higher symbol rate to achieve a further increase in throughput/bandwidth (since the gateway will be decoding the data frames transmitted at the increased symbol rate, there is no longer a need for a lower order terminal to be able to decode such data frames, and since the gateway allocated the timeslots for the increased symbol rate the gateway will know the symbol rate at which to decode the respective timeslots).

Figure 2B:
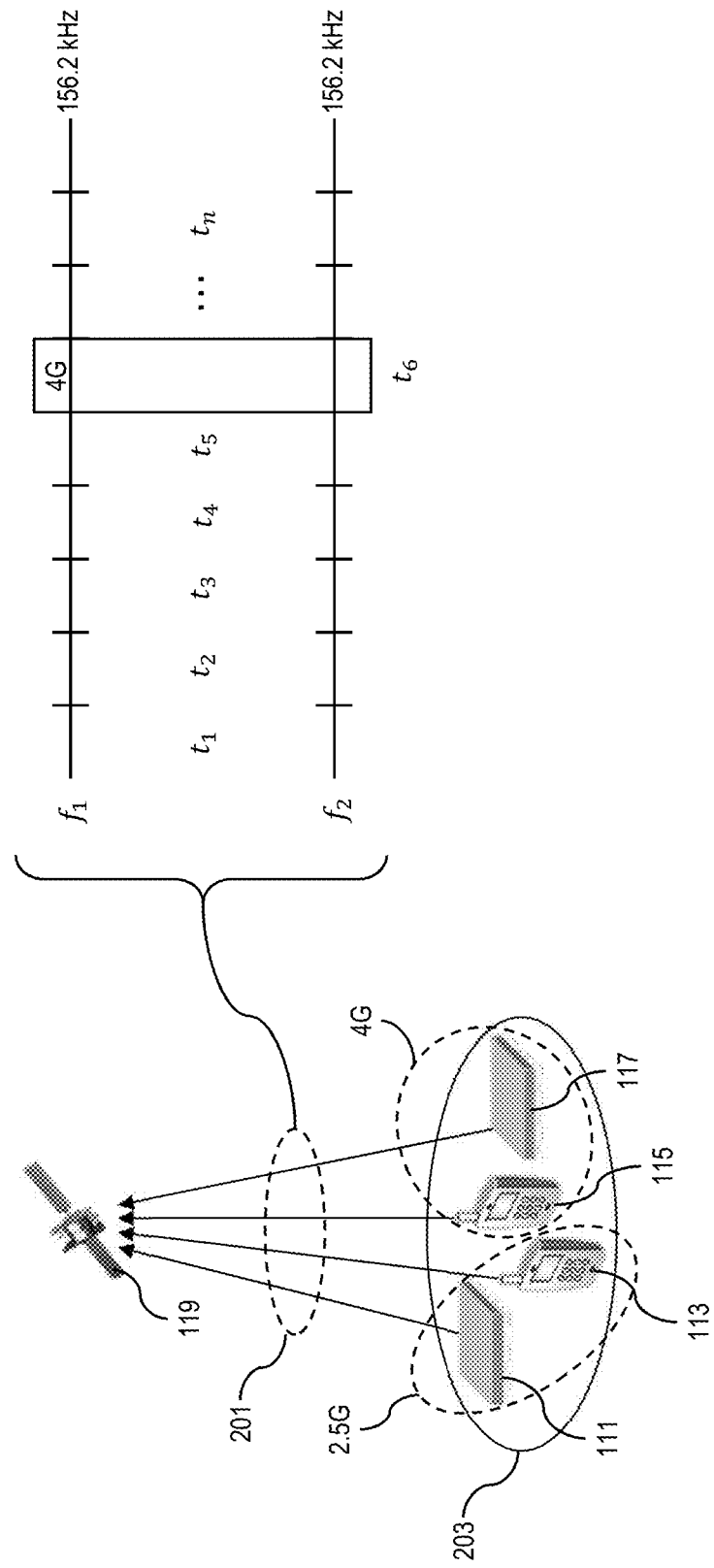
FIG. 2B depicts an example of two carriers or frequency channels of the return link of the system of FIG. 1B, being utilized as a single wideband carrier by a higher order user terminal, in accordance with example embodiments.

FIG. 2B depicts an example of two carriers or frequency channels of the return link of the system of FIG. 1B, being utilized as a single wideband carrier by a higher order user terminal (e.g., the user terminal 115, such as a 4G terminal with a low PA), in accordance with further example embodiments. According to such further example embodiments, an alternative increase in throughput may be achieved in the return link via a wideband single carrier transmission. For example, as provided above, a higher order terminal (e.g., 4G terminal) may be capable of transmitting on multiple carriers, and additionally, certain higher order terminal types (e.g., a terminal with a lower level transmit power amplifier (PA)) may be able to transmit data bursts, for example, on two adjacent or contiguous carriers as a combined single wideband carrier. By way of example, referring to FIG. 2B, the timeslot $t_6$ of each of the carriers $f_1$, $f_2$ can be allocated to one such terminal effectively doubling the throughput for that terminal (resulting in a 10×31.25 KHz sub-band on a single carrier). By way of further example, if contiguous spectrum is available for six 5× carriers (each of 156.25 kHz), then the terminal may transmit via a single 937.5 kHz sub-band. For such single carrier transmissions, however, the satellite may need to be capable of implementing a lossless reconstruction filter across the multiple sub-bands (e.g., the multiple 156.25 carriers combined for the single wideband transmission. In this manner, since the gateway has assigned the respective timeslots to a low PA terminal, the gateway will decode the transmission as a single carrier from that terminal.

The foregoing 6×156.25=937.5 MHz wideband single carrier, for example, may reflect the following characteristics:
  5 ms burst duration with approximately 702 ksps.
  Supports peak user data rates ranging from approximately 60 kbps to 3.2 Mbps—with a Spectral efficiency better than 3.4 bits/s/Hz and physical layer payload sizes may range from approx. 40 bytes to 2000 bytes.

Suite of different modulation types and code rates would enable reliable links across terminals with different capabilities (terminal EIRP, G/T, form factor, and processing power)—with channel capacity approaching LDPC FEC for power efficiency, Robust π/2-BPSK and π/4-QPSK for very low SNR operation and mobility, spectrally and power efficient 16/32/64 APSKs for high user throughput.

Burst may consist of Guard, Unique Words (UWs), PUI and Payload symbols, where PUI may be located at the beginning portion of the burst enabling dynamic downlink MCS changes and transmit power and rate change.

The following table reflects potential modulation and coding schemes for terminal uplink channels:

| Payload Modulation Types | Tx Rate in Ksps | Burst Duration in ms | No of Coded Bits | FEC Rate (Approx.) | Payload in no of bits | Payload (info) in no of bytes | Peak Payload Data Rate in Mbps | Estimated Es/No (dB) @ FER 1e–04 in AWGN with Ideal Receiver |
|---|---|---|---|---|---|---|---|---|
| 64-APSK | 702 | 5 | 18540 | 6/7 | 15888 | 1986 | 3.18 | 17.7 |
|  | 702 | 5 | 18540 | 5/6 | 15448 | 1931 | 3.09 | 17.1 |
|  | 702 | 5 | 18540 | 4/5 | 14832 | 1854 | 2.97 | 16.4 |
|  | 702 | 5 | 18540 | 3/4 | 13904 | 1738 | 2.78 | 15.5 |
| 32-APSK | 702 | 5 | 15450 | 6/7 | 13240 | 1655 | 2.65 | 15.4 |
|  | 702 | 5 | 15450 | 5/6 | 12872 | 1609 | 2.57 | 14.8 |
|  | 702 | 5 | 15450 | 4/5 | 12360 | 1545 | 2.47 | 14.1 |
|  | 702 | 5 | 15450 | 3/4 | 11584 | 1448 | 2.32 | 13.2 |
| 16-APSK | 702 | 5 | 12360 | 6/7 | 10592 | 1324 | 2.12 | 12.6 |
|  | 702 | 5 | 12360 | 4/5 | 9888 | 1236 | 1.98 | 11.5 |
|  | 702 | 5 | 12360 | 3/4 | 9264 | 1158 | 1.85 | 10.9 |
|  | 702 | 5 | 12360 | 2/3 | 8624 | 1078 | 1.72 | 10.4 |
| 3π/8-8-PSK | 702 | 5 | 9270 | 6/7 | 7992 | 999 | 1.60 | 10.5 |
|  | 702 | 5 | 9270 | 7/9 | 7176 | 897 | 1.44 | 8.6 |
|  | 702 | 5 | 9270 | 2/3 | 6312 | 789 | 1.26 | 7.2 |
|  | 702 | 5 | 9270 | 5/8 | 5852 | 732 | 1.17 | 6.5 |
| π/4-QPSK | 702 | 5 | 6180 | 7/8 | 5392 | 674 | 1.08 | 6.3 |
|  | 702 | 5 | 6180 | 4/5 | 4928 | 616 | 0.99 | 5.1 |
|  | 702 | 5 | 6180 | 5/7 | 4432 | 554 | 0.89 | 4.0 |
|  | 702 | 5 | 6180 | 5/8 | 3856 | 482 | 0.77 | 3.0 |
|  | 702 | 5 | 6180 | 1/2 | 3304 | 413 | 0.66 | 1.7 |
|  | 702 | 5 | 6180 | 4/9 | 2760 | 345 | 0.55 | 0.6 |
| π/2-BPSK | 702 | 5 | 3090 | 5/8 | 1920 | 240 | 0.38 | −0.1 |
|  | 702 | 5 | 3090 | 1/2 | 1524 | 191 | 0.30 | −1.6 |
|  | 702 | 5 | 3090 | 1/3 | 1056 | 132 | 0.21 | −3.4 |
|  | 702 | 5 | 3090 | 2/9 | 668 | 84 | 0.13 | −5.5 |
|  | 702 | 5 | 3090 | 1/9 | 320 | 40 | 0.06 | −8.1 |

Accordingly, at the gateway/SBSS, the gateway can forward received data packets to the appropriate core network (CN) based the terminal type from which the packets were received—the SBSS would forward packets received from a lower order terminal (e.g., 2.5G terminal) to the respective CN (e.g., the 2.5G CN), and would forward packets received from a higher order terminal (e.g., 4G terminal) to the respective CN (e.g., the 4G CN)—(see, e.g., FIG. 1B).

For example, the following table shows an example of the range of possible packet bearers for a 4G air interface:

| Attribute | Values |
|---|---|
| Bandwidths | 31.25 KHz, 62.5 KHz, 156.25 KHz, 312.5 KHz (2 × 156.25 KHZ), 218.75 KHz (156.25 + 62.5 KHz), 937.5 KHz (6 × 156.25 KHz) |
| Modulation Schemes | π/2 BPSK, π/4 QPSK, 16-APSK, 32-APSK, 64-APSK |
| Coding Schemes | Golay, Convolutional, Low Density Parity Check (LDPC), Turbo Codes |
| Coding Rates | 1/2, 5/8, 2/3, 3/4, 5/6, 4/5, 9/10 |

-continued

| Attribute | Values |
|---|---|
| Return Data Rates | >2 Mbps using carrier aggregation, ≤512 kbps using 156.25 KHz carriers |
| Forward Data Rates | >2 Mbps using carrier aggregation |

Figure 5A:
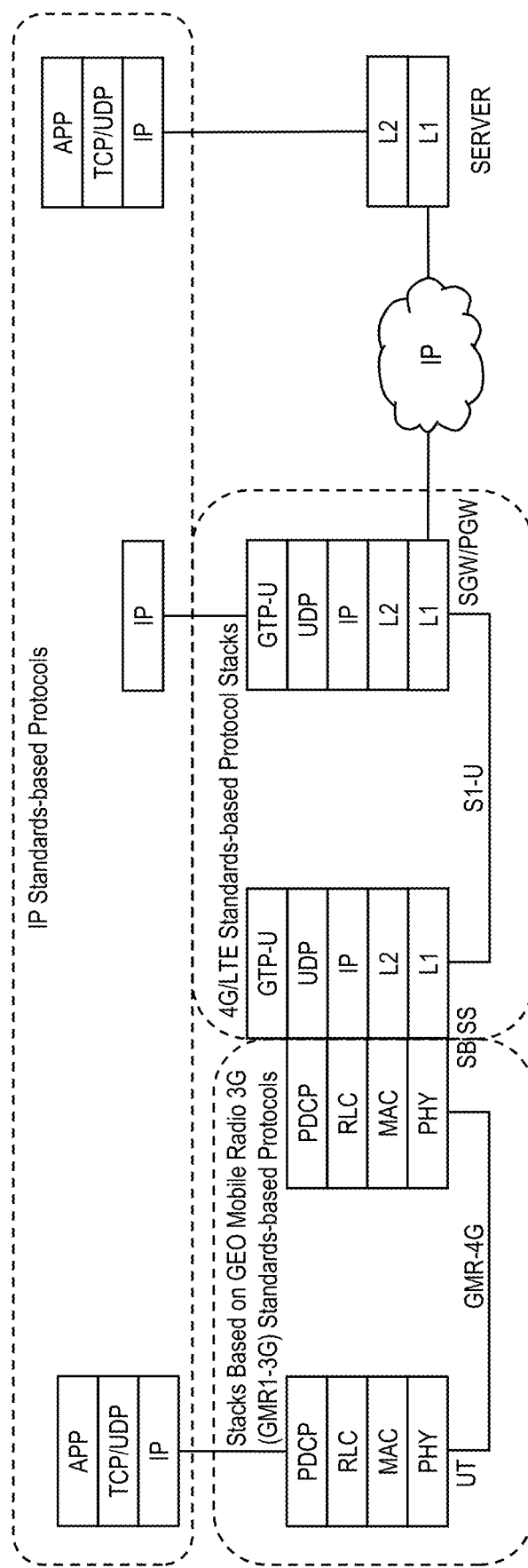
FIG. 5A depicts an example of the 4G user plane protocol stack, in accordance with example embodiments.
Figure 5B:
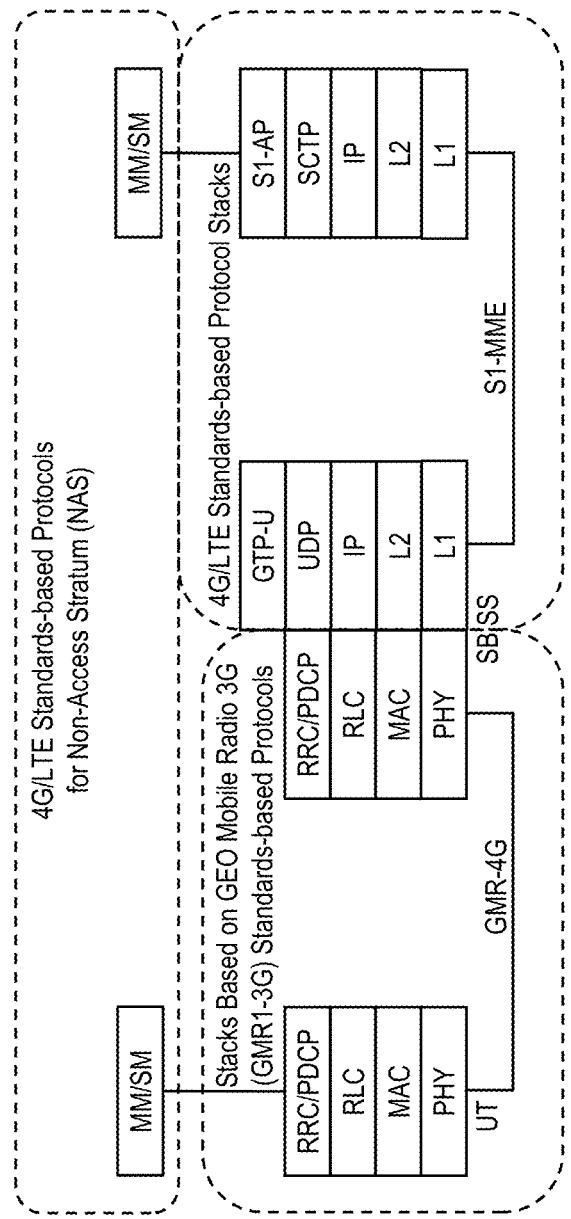
FIG. 5B depicts an example of the 4G control plane protocol stack, in accordance with example embodiments.

FIG. 5A depicts an example of the 4G user plane protocol stack, and FIG. 5B depicts an example of the 4G control plane protocol stack, in accordance with example embodiments. According to such example embodiments, the communications between the different terminal types and the satellite gateway (SBSS) address the use of the different transmission protocols—accordingly, (i) in the UT, all such protocol conversions are performed at the lower layers such that the upper layers may be based on standard IP protocols for the user plane and the standard LTE NAS protocols for the control plane, and (ii) in the SBSS all such protocol conversions are also performed at the lower layers such that the core network entities can implement standard communications protocols (e.g., 2.5G, 3G and 4G/LTE protocols), where the gateway converts the data packets accordingly and forwards the data packets respectively to the appropriate core network entities.

Figure 6:
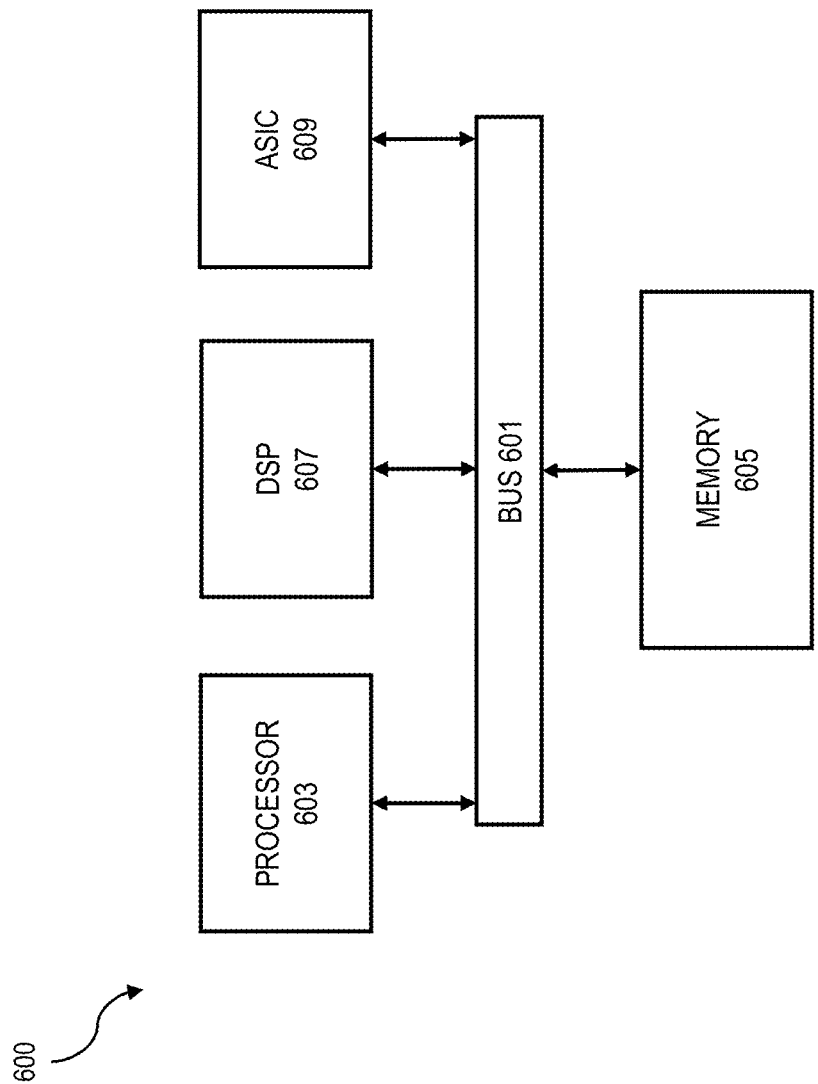
FIG. 6 illustrates a block diagram of a chip set, one or more of which may be configured to respectively implement different aspects of example embodiments of the present invention.

FIG. 6 illustrates a block diagram of a chip set, one or more of which may be configured to respectively implement different aspects of example embodiments of the present invention. The chip set 600 includes, for instance, processor and memory components incorporated in one or more physical packages. By way of example, a physical package includes an arrangement of one or more materials, components, and/or wires on a structural assembly (e.g., a baseboard or printed circuit board) to provide one or more characteristics such as physical strength, conservation of size, and/or limitation of electrical interaction.

In one embodiment, the chip set includes a communications mechanism such as a bus 601 for passing information among the components of the chip set. A processor 603 has connectivity to the bus to execute instructions/programs and process information stored in, for example, a memory 605. The processor may include one or more processing cores with each core configured to perform independently. A multi-core processor enables multiprocessing within a single physical package, such as two, four, eight, or greater numbers of processing cores. Alternatively or in addition, the processor may include one or more microprocessors configured in tandem via the bus to enable independent execution of instructions, pipelining, and multithreading. The processor may also be accompanied with one or more specialized components to perform certain processing functions and tasks such as one or more digital signal processors (DSP) 607, and/or one or more application-specific integrated circuits (ASIC) 609. A DSP typically is configured to process real-time signals (e.g., sound or video) in real time independently of the processor. Similarly, an ASIC can be configured to performed specialized functions not easily performed by a general purpose processor. Other specialized components to aid in performing the inventive functions described herein may include one or more field programmable gate arrays (FPGA) (not shown), one or more controllers (not shown), or one or more other special-purpose computer chips.

The processor and accompanying components have connectivity to the memory via the bus. The memory may include both dynamic memory (e.g., RAM) and static memory (e.g., ROM) for storing executable instructions that, when executed by the processor and/or the DSP and/or the ASIC, perform the process of example embodiments as described herein. The memory may also store the data associated with or generated by the execution of the process.

Further, the functionality of the example embodiments of the present invention may be provided by the chip set, in response to the processor executing an arrangement of program instructions contained in memory. Execution of the program instructions contained in memory causes the processor to perform the process steps and generate the results described herein, or equivalents thereof. One or more processors in a multi-processing arrangement can also be employed to execute the program instructions. In alternative embodiments, hard-wired circuitry can be used in place of or in combination with software instructions to implement the example embodiments. Thus, embodiments of the present invention are not limited to any specific combination of hardware circuitry and software.

Figure 7:
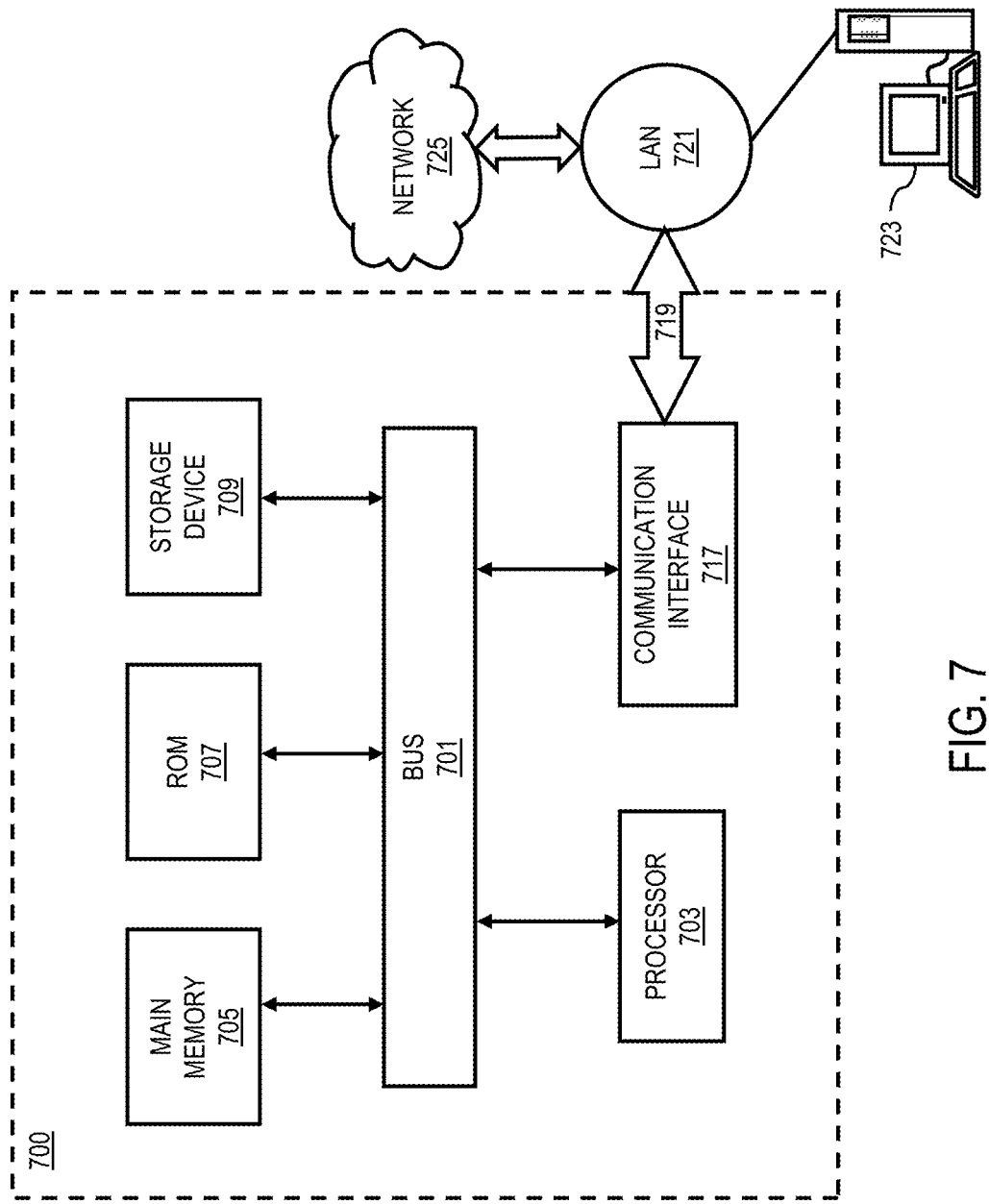
FIG. 7 illustrates a computer system, whereby one or more of which may be configured to respectively implement different aspects of example embodiments of the present invention.

FIG. 7 illustrates a computer system, whereby one or more of which may be configured to respectively implement different aspects of example embodiments of the present invention. The computer system 700 may include a bus 701 or other communication mechanism for communicating information, and one or more processors 703 (of which one is shown in the Figure) coupled to the bus for processing information. The computer system may also include a memory 705, such as a random access memory (RAM) or other dynamic storage device, coupled to the bus for storing information and instructions to be executed by the processor(s). The memory can also be used for storing temporary variables or other intermediate information during execution of instructions to be executed by the processor(s). The computer system may further include a read only memory (ROM) 707 or other static storage device coupled to the bus for storing static information and instructions for the processor(s). The computer system may further include a storage device 709, such as a magnetic disk or optical disk, additionally coupled to the bus for storing information and instructions.

According to one embodiment of the invention, approaches in accordance with example embodiments are provided by the computer system 700 in response to the processor(s) executing an arrangement of instructions contained in the memory. Such instructions can be read into the memory from another computer-readable medium, such as the storage device. Execution of the arrangement of instructions causes the processor(s) to perform the process steps and/or device functions or operation described herein. One or more processors in a multi-processing arrangement may also be employed to execute the instructions. In alternative embodiments, hard-wired circuitry is used in place of or in combination with software instructions to implement such embodiments of the present invention. Thus, embodiments of the present invention are not limited to any specific combination of hardware circuitry and software.

The computer system may also include a communication interface 717 coupled to the bus. The communication interface may provide two-way data communications, for example, coupling to a network link 719 connected to a local network 721. The network link may provide data communication through one or more networks to other data devices. For example, the network link may provide a connection through local network to a host computer 723, which has connectivity to a network 725 (e.g. a wide area network (WAN) or the Internet) or to data equipment operated by one or more service providers.

While example embodiments of the present invention may provide for various implementations (e.g., including hardware, firmware and/or software components), and, unless stated otherwise, all functions are performed by a CPU or a processor executing computer executable program code stored in a non-transitory memory or computer-readable storage medium, the various components can be implemented in different configurations of hardware, firmware, software, and/or a combination thereof. Except as otherwise disclosed herein, the various components shown in outline or in block form in the figures are individually well known and their internal construction and operation are not critical either to the making or using of this invention or to a description of the best mode thereof.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method for wireless data communications, comprising:
receiving a plurality of data packets intended for transmission to a first communications terminal;
receiving a plurality of further data packets intended for transmission to a second communications terminal;
formatting the plurality of data packets as at least one data burst in accordance with a first transmission protocol for transmission over a first frequency channel of a wireless communications network, wherein the first frequency channel is configured based on the first transmission protocol;
formatting the plurality of further data packets as at least one data burst in accordance with a second transmission protocol for transmission over the first frequency channel, wherein the one or more further data packets are formatted for transmission at a throughput rate of the second transmission protocol that is not compatible with the first transmission protocol;

transmitting one or more of the at least one data burst formatted in accordance with the first transmission protocol over the first frequency channel for receipt by the first communications terminal;

transmitting one or more of the at least one data burst formatted in accordance with the second transmission protocol over the first frequency channel for receipt by the second communications terminal;

configuring an information data packet for a respective one of each of the one or more data bursts such that each information data packet indicates the transmission protocol in accordance with which the respective one of the one or more data bursts was formatted;

formatting each of the information data packets in accordance with the first transmission protocol for transmission over the first frequency channel; and transmitting each of the information data packets as formatted in accordance with the first transmission protocol, together with the respective one of the one or more data bursts, over the first frequency channel for receipt by both the first communications terminal and the second communications terminal.

2. The method according to claim 1, wherein the first communications terminal is configured to receive data communications transmitted in accordance with the first transmission protocol and is not configured to receive data communications transmitted in accordance with the second transmission protocol, and the second communications terminal is configured to receive data communications transmitted in accordance with both the first transmission protocol and the second transmission protocol.

3. The method according to claim 1, wherein each of one or more of the information data packets includes information indicating an allocation of one or more timeslots of a second frequency channel assigned to a respective one of the first and second communications terminals for transmission of data communications over the second frequency channel by the respective one of the first and second communications terminals.

4. The method according to claim 1, wherein the first communications terminal is configured to receive data communications transmitted in accordance with the first transmission protocol and is not configured to receive data communications transmitted in accordance with the second transmission protocol, and the second communications terminal is configured to receive data communications transmitted in accordance with both the first transmission protocol and the second transmission protocol.

5. The method according to claim 1, wherein:

the at least one data burst formatted in accordance with the second transmission protocol comprises a plurality of data bursts formatted in accordance with the second transmission protocol, and formatted for transmission at the throughput rate of the second transmission protocol that is not compatible with the first transmission protocol; and the method further comprises (i) transmitting a first subset of the plurality of data bursts over the first frequency channel for receipt by the second communications terminal, and (ii) transmitting a second subset of the plurality of data bursts over a second frequency channel of the wireless communications network for receipt by the second communications terminal, wherein the second frequency channel is also configured based on the first transmission protocol.

6. The method according to claim 5, wherein the data packets that were formatted as the plurality of data bursts are all related to a one application or service associated with the second communications terminal.

7. A gateway terminal for wireless data communications, comprising:

a processor device; and a transmitter device; and wherein the processor device is configured to receive a plurality of data packets intended for transmission to a first communications terminal, and to receive a plurality of further data packets intended for transmission to a second communications terminal; and wherein the processor device is further configured to format the plurality of data packets as at least one data burst in accordance with a first transmission protocol for transmission over a first frequency channel of a wireless communications network, wherein the first frequency channel is configured based on the first transmission protocol, wherein the processor device is further configured to format the plurality of further data packets as at least one data burst in accordance with a second transmission protocol for transmission over the first frequency channel, wherein the one or more further data packets are formatted for transmission at a throughput rate of the second transmission protocol that is not compatible with the first transmission protocol, wherein the transmitter device is configured to transmit one or more of the at least one data burst formatted in accordance with the first transmission protocol over the first frequency channel for receipt by the first communications terminal, wherein the transmitter device is further configured to transmit one or more of the at least one data burst formatted in accordance with the second transmission protocol over the first frequency channel for receipt by the second communications terminal, wherein the processor device is further configured to configure an information data packet for a respective one of each of the one or more data bursts such that each information data packet indicates the transmission protocol in accordance with which the respective one of the one or more data bursts was formatted, wherein the processor device is further configured to format each of the information data packets in accordance with the first transmission protocol for transmission over the first frequency channel, and wherein each of the information data packets as formatted in accordance with the first transmission protocol are configured to be transmitted, together with the respective one of the one or more data bursts, over the first frequency channel for receipt by both the first communications terminal and the second communications terminal.

8. The gateway terminal according to claim 7, wherein the first communications terminal is configured to receive data communications transmitted in accordance with the first transmission protocol and is not configured to receive data communications transmitted in accordance with the second transmission protocol, and the second communications terminal is configured to receive data communications transmitted in accordance with both the first transmission protocol and the second transmission protocol.

9. The gateway terminal according to claim 7, wherein each of one or more of the information data packets includes information indicating an allocation of one or more timeslots of a second frequency channel assigned to a respective one of the first and second communications terminals for transmission of data communications over the second frequency channel by the respective one of the first and second communications terminals.

10. The gateway terminal according to claim 7, wherein the first communications terminal is configured to receive data communications transmitted in accordance with the first transmission protocol and is not configured to receive data communications transmitted in accordance with the second transmission protocol, and the second communications terminal is configured to receive data communications transmitted in accordance with both the first transmission protocol and the second transmission protocol.

11. The gateway terminal according to claim 7, wherein:
the at least one data burst formatted in accordance with the second transmission protocol comprises a plurality of data bursts formatted in accordance with the second transmission protocol, and formatted for transmission at the throughput rate of the second transmission protocol that is not compatible with the first transmission protocol; and
(i) a first subset of the plurality of data bursts are configured for transmission over the first frequency channel for receipt by the second communications terminal, and
(ii) a second subset of the plurality of data bursts are configured for transmission over a second frequency channel of the wireless communications network for receipt by the second communications terminal, wherein the second frequency channel is also configured based on the first transmission protocol.

12. The gateway terminal according to claim 11, wherein the data packets that were formatted as the plurality of data bursts are all related to a one application or service associated with the second communications terminal.

13. A system for wireless data communications, comprising:
a gateway terminal comprising a processor device and a transmitter device; and
a first communications terminal and a second communications terminal; and
wherein the processor device of the gateway terminal is configured to receive a plurality of data packets intended for transmission to a first communications terminal, and to receive a plurality of further data packets intended for transmission to a second communications terminal,
wherein the processor device of the gateway terminal is further configured to format the plurality of data packets as at least one data burst in accordance with a first transmission protocol for transmission over a first frequency channel of a wireless communications network, wherein the first frequency channel is configured based on the first transmission protocol,
wherein the processor device of the gateway terminal is further configured to format the plurality of further data packets as at least one data burst in accordance with a second transmission protocol for transmission over the first frequency channel, wherein the one or more further data packets are formatted for transmission at a throughput rate of the second transmission protocol that is not compatible with the first transmission protocol,
wherein the transmitter device of the gateway terminal is configured to transmit one or more of the at least one data burst formatted in accordance with the first transmission protocol over the first frequency channel for receipt by the first communications terminal,
wherein the transmitter device of the gateway terminal is further configured to transmit one or more of the at least one data burst formatted in accordance with the second transmission protocol over the first frequency channel for receipt by the second communications terminal,
wherein the first communications terminal is configured to receive data communications transmitted in accordance with the first transmission protocol and is not configured to receive data communications transmitted in accordance with the second transmission protocol, and the second communications terminal is configured to receive data communications transmitted in accordance with both the first transmission protocol and the second transmission protocol,
wherein the processor device of the gateway terminal is further configured to configure an information data packet for a respective one of each of the one or more data bursts such that each information data packet indicates the transmission protocol in accordance with which the respective one of the one or more data bursts was formatted;
wherein the processor device of the gateway terminal is further configured to format each of the information data packets in accordance with the first transmission protocol for transmission over the first frequency channel; and
wherein each of the information data packets as formatted in accordance with the first transmission protocol are configured to be transmitted, together with the respective one of the one or more data bursts, over the first frequency channel for receipt by both the first communications terminal and the second communications terminal.

14. The system according to claim 13:
wherein the at least one data burst formatted in accordance with the second transmission protocol comprises a plurality of data bursts formatted in accordance with the second transmission protocol, and formatted for transmission at the throughput rate of the second transmission protocol that is not compatible with the first transmission protocol; and
wherein (i) a first subset of the plurality of data bursts are configured for transmission over the first frequency channel for receipt by the second communications terminal, and (ii) a second subset of the plurality of data bursts are configured for transmission over a second frequency channel of the wireless communications network for receipt by the second communications terminal, wherein the second frequency channel is also configured based on the first transmission protocol.

* * * * *